(12) United States Patent
Hasegawa et al.

(10) Patent No.: US 7,204,215 B2
(45) Date of Patent: Apr. 17, 2007

(54) VALVE CHARACTERISTIC CONTROLLER AND CONTROL METHOD FOR INTERNAL COMBUSTION ENGINE

(75) Inventors: Tadao Hasegawa, Toyota (JP); Yoshihito Moriya, Nagoya (JP); Noboru Takagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 11/257,155

(22) Filed: Oct. 25, 2005

(65) Prior Publication Data
US 2006/0243231 A1 Nov. 2, 2006

(30) Foreign Application Priority Data
Oct. 26, 2004 (JP) ............................. 2004-311323

(51) Int. Cl.
*F01L 1/34* (2006.01)
(52) U.S. Cl. .................... 123/90.15; 123/90.17; 123/90.31
(58) Field of Classification Search ............. 123/90.15, 123/90.16, 90.17, 90.31
See application file for complete search history.

(56) References Cited

U.S. PATENT DOCUMENTS 6,213,069 B1* 4/2001 Wada et al. ............. 123/90.15

FOREIGN PATENT DOCUMENTS

| JP | A 2003-314308 | 11/2003 |
| JP | A 2004-59463 | 2/2004 |
| JP | A 2004-150397 | 5/2004 |

* cited by examiner

*Primary Examiner*—Thomas Denion
*Assistant Examiner*—Zelalem Eshete
(74) *Attorney, Agent, or Firm*—Oliff & Berridge, PLC

(57) ABSTRACT

A valve characteristic controller for an engine including variable valve actuation mechanisms, one for a first valve and another for a second valve, to vary the opening and closing timings of the valves. The controller executes main control to calculate a target timing of the first valve in accordance with an operation state of the engine and has the corresponding variable valve actuation mechanism adjust the timing of the first valve to the target timing. Further, the controller executes sub-control to calculate a target timing of the second valve based on a target valve overlap amount and the actual timing of the first valve and has the corresponding variable valve actuation mechanism adjust the valve timing of the second valve to the target timing. The main control is executed on the one of the two variable valve actuation mechanisms having a lower response speed.

19 Claims, 5 Drawing Sheets

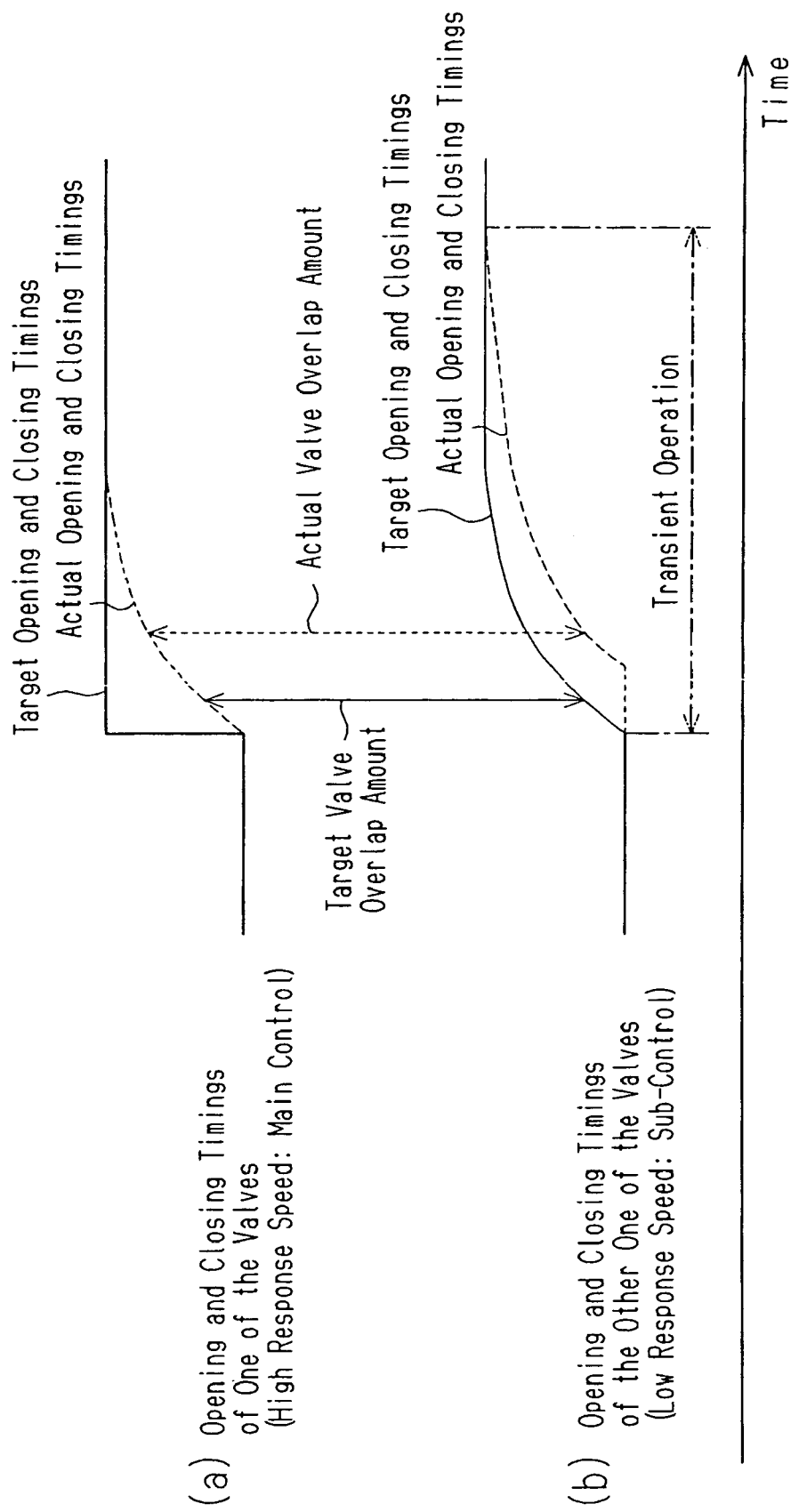

VALVE CHARACTERISTIC CONTROLLER AND CONTROL METHOD FOR INTERNAL COMBUSTION ENGINE

BACKGROUND OF THE INVENTION

The present invention relates to a valve characteristic controller and a valve characteristic control method for an internal combustion engine.

Internal combustion engines, such as engines for automobiles, may include a variable valve actuation mechanism for varying the valve characteristic of engine valves including intake and exhaust valves. Examples of valve characteristics include the valve opening and closing timings, the maximum valve lift amount, and the valve actuation angle. In such an internal combustion engine, the variable valve actuation mechanism is hydraulically driven and controlled based on the operation state of the engine so that the valve characteristic of the engine valves is optimized in accordance with the engine operation state. This increases the output of the internal combustion engine and improves the exhaust emissions.

For example, when the internal combustion engine is required to generate a high output, the valve characteristic of the engine valves is adjusted to increase the intake air charging efficiency of the engine. Such adjustment of the valve characteristic increases the amount of air-fuel mixture burned in the combustion chambers of the engine and increases the output of the internal combustion engine.

When the internal combustion engine is not required to generate a high output, the valve characteristic of the engine valves is adjusted to maximize the amount of internal EGR (exhaust gas recirculation) within a range in which the EGR gas does not affect combustion. The internal EGR amount changes in accordance with the valve overlap amount in which the exhaust and intake valves are both open. The valve overlap amount is adjusted to maximize the internal EGR amount in the above range. The maximizing of the internal EGR lowers the combustion temperature and reduces the production of nitrogen oxide (NOx). This improves the exhaust emission of the internal combustion engine.

In internal combustion engines that vary the valve characteristic of the engine valves, there is one type that separately varies the valve characteristic of the intake valves and the valve characteristic of the exhaust valves. Such an internal combustion engine performs the adjustment of the internal EGR amount more accurately so as to raise the output by increasing the intake air charging efficiency and to improve the exhaust emissions. Japanese Laid-Open Patent Publication No. 2003-314308 describes an internal combustion engine including a variable valve actuation mechanism for varying the opening and closing timings of its intake valves and a variable valve actuation mechanism for varying the opening and closing timings of its exhaust valves. This internal combustion engine separately controls the two variable valve actuation mechanisms to vary the opening and closing timings of both intake and exhaust valves.

In this internal combustion engine, the target opening and closing timings of the intake valves and the target opening and closing timings of the exhaust valves are separately calculated in accordance with the engine operation state. The two variable valve actuation mechanisms are controlled so that the opening and closing timings of the intake and exhaust valves are adjusted to the calculated target valve timings. The adjustment of the opening and closing timings of both the intake and exhaust valves in this manner further increases the intake air charging efficiency and improves the accuracy for adjusting the internal EGR amount.

The internal combustion engine described in the above publication controls the valve overlap amount in accordance with the engine operation state so that the valve overlap amount becomes optimum. The internal combustion engine sets the target opening and closing timings of the intake and exhaust valves so as to achieve the optimum valve overlap amount. The opening and closing timings of the intake and exhaust valves are then varied to converge to the target opening and closing timings. By varying the opening and closing timings of the intake and exhaust valves, the valve overlap amount converges on the optimum amount, that is, the target valve overlap amount. The valve overlap amount is optimized in this way.

However, a delay in response occurs when varying the opening and closing timings of the intake and exhaust valves to the target timings. Due to such a delay, the actual valve overlap amount may deviate from the target valve overlap amount when varying the opening and closing timings of the intake and exhaust valves to the target timings. For example, the engine operation state may change when the opening and closing timings of the intake and exhaust valves are converging on the target valve timings. This would accordingly alter the target valve overlap amount. In such a case, the target opening and closing timings of the intake and exhaust valves would also have to change accordingly. As a result, during such transient operation of the engine in which the opening and closing timings of the intake and exhaust valves are still in the process of converging on the target timings, the actual valve overlap amount would deviate from the target valve overlap amount.

To prevent the actual valve overlap amount from deviating from the target valve overlap amount during such transient operation, the above publication proposes execution of a main control and a sub-control to control the opening and closing timings of the intake and exhaust valves.

[Main Control]

The target opening and closing timings of either one of the intake and exhaust valves are calculated in accordance with the engine operation state. The variable valve actuation mechanism for the valves of which target opening and closing timings are calculated is controlled so that the actual opening and closing timings are adjusted to the calculated target timings.

[Sub-Control]

The target opening and closing timings of the other one of the intake valve and the exhaust valve are calculated based on the target valve overlap amount, which is calculated in accordance with the engine operation state, and the actual opening and closing timings of the valves, the opening and closing timings of which have been adjusted by the main control. The variable valve actuation mechanism for the other one of the intake and exhaust valves is then controlled so that its actual opening and closing timings are adjusted to the calculated target timings.

Under the valve timing control including the main control and the sub-control, while the opening and closing timings of either one of the intake and exhaust valves is being adjusted to its target timings, the target opening and closing timings of the other one of the intake and exhaust valves are calculated so as to achieve the target valve overlap amount corresponding to the actual opening and closing timings of the valves of which opening and closing timings are being adjusted. Then, the opening and closing timings of the other one of the intake and exhaust valves is adjusted toward its calculated target opening and closing timing. Accordingly, the opening and closing timings of the other one of the intake and exhaust valves changes so as to achieve the target valve overlap amount. In this manner, the actual valve overlap amount is prevented from deviating from the target valve overlap amount during the above transient operation.

Even if the two variable valve actuation mechanisms for varying the opening and closing timings of the intake valves separately from the opening and closing timings of the exhaust valves have the same structure, the two variable valve actuation mechanisms respond at different speeds when being driven. This is because the two variable valve actuation mechanisms are installed at different positions, and the passages through which oil used to drive these mechanisms have different lengths. This difference in length is reflected as the different response speeds of the two variable valve actuation mechanisms.

Further, one of the two variable valve actuation mechanisms may be driven by hydraulic power and the other one of the variable valve actuation mechanisms may be driven by electromotive power, such as an electric motor. In this case, the two variable valve actuation mechanisms have completely different structures and thus have completely different response speed characteristics. A hydraulic variable valve actuation mechanism tends to have a higher response speed at higher engine speeds at which hydraulic pressure increases. An electromotive variable valve actuation mechanism tends to have a relatively high response speed even at low engine speeds. Such differences in the two variable valve actuation mechanisms having different structures further increases the difference in response speeds.

Regardless of whether the two variable valve actuation mechanisms have the same structure or completely different structures, the difference between the response speeds of the two mechanisms may cause the actual valve overlap amount to greatly exceed the target valve overlap amount during transient operation. Such a state may occur when the main control is applied to the one of the variable valve actuation mechanisms having the higher response speed and the sub-control is applied to the other one of the two variable valve actuation mechanisms having the lower response speed.

In the above state, the reason why the actual valve overlap amount greatly exceeds the target valve overlap amount will be described with reference to the time chart shown in FIG. 6. In section (a) of FIG. 6, the solid line indicates changes in the target opening and closing timings of one of the intake and exhaust valves during execution of the main control. The broken line indicates changes in the actual opening and closing timings of this one of the intake and exhaust valves during execution of the main control. In section (b) of FIG. 6, the solid line indicates changes in the target valve timing of the other one of the intake and exhaust valves during execution of the sub-control. The broken line indicates changes in the actual opening and closing timings of the one of the intake and exhaust valves during execution of the sub-control. In FIG. 6, the arrow formed by a solid line indicates the target overlap amount, and the arrow formed by a broken line indicates the actual valve overlap amount.

The main control is performed with the variable valve actuation mechanism having a higher response speed, which corresponds to the one of the intake and exhaust valves. The sub-control is performed with the variable valve actuation mechanism having a lower response speed, which corresponds to the other one of the intake and exhaust valves. As indicated by the broken line in section (b) of FIG. 6, the main control and the sub-control changes the actual opening and closing timings of the other one of the intake and exhaust valves so that the valve overlap amount decreases, or shifts in an upward direction as viewed in FIG. 6. The valve timing control will now be described.

During transient operation of the engine, the response speed of the variable valve actuation mechanism for the other one of the intake and exhaust valves affects changes in the actual opening and closing timings of the other one of the intake and exhaust valves during execution of the sub-control. More specifically, the actual opening and closing timings of the other one of the intake and exhaust valves changes slowly as compared with the change in the target opening and closing timings. Thus, even if the main control and the sub-control ensure the required valve overlap amount, the actual valve overlap amount (as indicated by the broken-line arrow) greatly exceeds the target valve overlap amount (as indicated by the solid-line arrow) during transient operation of the engine. Further, the actual valve overlap amount also deviates from the target valve overlap amount when the target valve overlap amount changes. However, as shown in section (a) of FIG. 6, when the main control causes the opening and closing timings of the one of the intake and exhaust valves to increase the valve overlap amount, or shifts the valve overlap amount in an upward direction as viewed in FIG. 6, there is a high possibility of the actual valve overlap greatly exceeding the target valve overlap amount.

When the actual valve overlap amount greatly exceeds the target valve overlap amount, the internal EGR amount may become excessive and lower the combustion temperature or increase the blow-by amount of intake air from the intake passage to the exhaust passage thereby destabilizing combustion. This may adversely affect the operation of the internal combustion engine.

The same problem may also occur in internal combustion engines including variable valve actuation mechanisms that adjust the valve overlap amount by varying other valve characteristics, such as the maximum valve lift amount or the valve actuation angle.

SUMMARY OF THE INVENTION

It is an object of the present invention to provide a valve characteristic controller and a valve characteristic control method for an internal combustion engine that prevent the actual valve overlap amount from greatly exceeding a target valve overlap amount during transient operation of the engine.

One aspect of the present invention is a valve characteristic controller for an internal combustion engine. The engine includes a variable valve actuation mechanism for varying a valve characteristic of an intake valve and a variable valve actuation mechanism for varying a valve characteristic of an exhaust valve. The controller includes a main control unit for calculating a target characteristic of a first valve, which is one of the intake valve and the exhaust valve, in accordance with an operation state of the engine, and controlling the variable valve actuation mechanism corresponding to the first valve so that the valve characteristic of the first valve is adjusted to the target characteristic of the first valve. A sub-control unit calculates a target characteristic of a second valve, which is the other one of the intake valve and the exhaust valve, based on a target valve overlap amount, which is calculated in accordance with the operation state of the engine, and an actual valve characteristic of the first valve, and controls the variable valve actuation mechanism corresponding to the second valve so that the valve characteristic of the second valve is adjusted to the target characteristic of the second valve. Control with the main control unit is executed on the one of the two variable valve actuation mechanisms having a lower response speed when being driven. Control with the sub-control-unit is executed on the other one of the two variable valve actuation mechanisms having a higher response speed when being driven.

Another aspect of the present invention is an internal combustion engine including a combustion chamber and an intake passage and an exhaust passage, each connected to the combustion chamber. An intake valve opens and closes the combustion chamber to the intake passage. A variable valve actuation mechanism varies a valve characteristic of the intake valve. An exhaust valve opens and closes the combustion chamber to the exhaust passage. A variable valve actuation mechanism varies a valve characteristic of the exhaust valve. A controller executes a main control on the one of the variable valve actuation mechanisms having a lower response speed when being driven and executes a sub-control on the other one of the variable valve actuation mechanisms having a higher response speed when being driven. The controller calculates during the main control a target characteristic of a first valve, which is one of the intake valve and the exhaust valve, in accordance with an operation state of the engine and controls the variable valve actuation mechanism corresponding to the first valve so that the valve characteristic of the first valve is adjusted to the target characteristic of the first valve. The controller calculates in the sub-control a target characteristic of a second valve, which is the other one of the intake valve and the exhaust valve, based on a target valve overlap amount, which is calculated in accordance with an operation state of the engine, and an actual valve characteristic of the first valve and controls the variable valve actuation mechanism corresponding to the second valve so that the valve characteristic of the second valve is adjusted to the target characteristic of the second valve.

A further aspect of the present invention is a method for controlling a valve characteristic of an internal combustion engine. The engine includes a variable valve actuation mechanism for varying a valve characteristic of an intake valve and a variable valve actuation mechanism for varying a valve characteristic of an exhaust valve. The method includes calculating a target characteristic of a first valve, which is one of the intake valve and the exhaust valve, in accordance with an operation state of the engine. The method also includes executing main control on the variable valve actuation mechanism corresponding to the first valve so that the valve characteristic of the first valve is adjusted to the target characteristic, calculating a target valve overlap amount in accordance with an operation state of the engine, and calculating a target characteristic of a second valve, which is the other one of the intake valve and the exhaust valve, based on the target valve overlap amount and an actual valve characteristic of the first valve. Further, the method includes executing sub-control on the variable valve actuation mechanism corresponding to the second valve so that the valve characteristic of the second valve is adjusted to the target characteristic, and executing the main control on the one of the variable valve actuation mechanisms having a lower response speed when being driven and executing the sub-control on the other one of the variable valve actuation mechanisms having a higher response speed.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a time chart showing changes in the target opening and closing timings and the actual opening and closing timings of the intake and exhaust valves in a prior art example.

DETAILED DESCRIPTION OF THE PREFERRED EMBODIMENTS

An automobile engine 1 according to a first embodiment of the present invention will now be described with reference to FIGS. 1 to 4.

Figure 1:
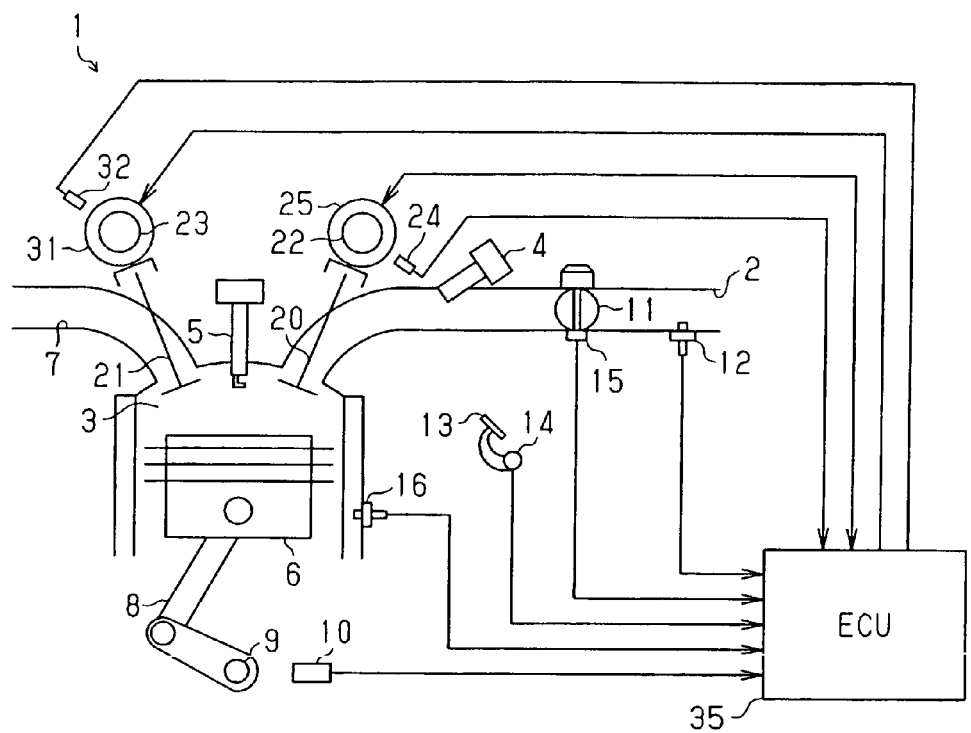
FIG. 1 is a schematic diagram showing the structures of an engine and a valve characteristic controller according to a first embodiment of the present invention.

In the engine 1 shown in FIG. 1, a mixture of air, which flows through an intake passage 2, and fuel, which is injected from a fuel injection valve 4 is drawn into a combustion chamber 3. The mixture of the air and fuel is ignited by an ignition plug 5 in the combustion chamber. The mixture in the combustion chamber 3 is burned to generate combustion energy that reciprocates a piston 6. A connecting rod 8 converts the reciprocation of the piston 6 into rotation of a crankshaft 9. The crankshaft 9 functions as an output shaft for the engine 1. The burned mixture is discharged as exhaust out of the combustion chamber 3 and into an exhaust passage 7.

In the engine 1, an intake valve 20 opens and closes to connect and disconnect the intake passage 2 and the combustion chamber 3. Further, an exhaust valve 21 opens and closes to connect and disconnect the exhaust passage 7 and the combustion chamber 3. An intake camshaft 22, which is rotated by the crankshaft 9, opens and closes the intake valve 20. An exhaust camshaft 23, which is rotated by the crankshaft 9, opens and closes the exhaust valve 21.

An intake variable valve actuation mechanism 25, which varies the valve characteristic of the intake valve 20, is arranged on the intake camshaft 22. As the valve characteristic, the intake variable valve actuation mechanism 25 changes the opening and closing timings of the intake valve 20. The variable valve actuation mechanism 25 changes the relative rotational phase of the intake camshaft 22 with respect to the rotation of the crankshaft 9 to change the opening and closing timings of the intake valve 20. More specifically, the period in which the intake valve 20 is open is advanced or retarded to change the opening timing and closing timings of the intake valve 20. In the present embodiment, an electromotive variable valve actuation mechanism that changes the relative rotational phase by driving an electric motor is used as the intake variable valve actuation mechanism 25.

An exhaust variable valve actuation mechanism 31, which varies the valve characteristic of the exhaust valve 21, is arranged on the exhaust camshaft 23. As the valve characteristic, the exhaust variable valve actuation mechanism 31 changes the opening and closing timings of the exhaust valve 21. The variable valve actuation mechanism 31 changes the relative rotational phase of the exhaust camshaft 23 with respect to the rotation of the crankshaft 9 to change the opening and closing timings of the exhaust valve 21. More specifically, the period in which the exhaust valve 21 is open is advanced or retarded to change the opening and closing timings of the exhaust valve 21. In the present embodiment, a hydraulic variable valve actuation mechanism that is supplied with oil from an oil pump, which is driven based on the engine speed, and changes the relative rotational phase using the pressure of the oil, is used as the exhaust variable valve actuation mechanism 31.

The electronic configuration of a valve characteristic controller for the engine 1 will now be described.

In the engine 1, the hydraulic driving of the intake variable valve actuation mechanism 25 and the electronic driving of the exhaust variable valve actuation mechanism 31 are controlled by an electronic control unit (ECU) 35. The ECU 35, which functions as a main control unit and a sub-control unit, is installed in the automobile to control the operation of the engine 1. The ECU 35 is provided with detection signals from various sensors described below.

The sensors include a crank position sensor 10 for outputting a signal corresponding to the rotation of the crankshaft 9, an intake cam position sensor 24 for detecting the rotational position of the intake camshaft 22, an exhaust cam position sensor 32 for detecting the rotational position of the exhaust camshaft 23, an accelerator pedal position sensor 14 for detecting the depressed amount of an accelerator pedal 13 of the automobile, a throttle position sensor 15 for detecting the opening degree of a throttle valve 11, an airflow meter 12 for detecting the amount of air flowing through the intake passage 2, and a coolant temperature sensor 16 for detecting the coolant temperature of the engine 1.

The ECU 35 controls the driving of the intake variable valve actuation mechanism 25 to control the opening and closing timings of the intake valve 20. When controlling the opening and closing timings of the intake valve 20, the variable valve actuation mechanism 25 is driven so that the actual opening and closing timings of the intake valve 20 approaches its target opening and closing timings. Further, the ECU 35 controls the driving of the exhaust variable valve actuation mechanism 31 to control the opening and closing timings of the exhaust valve 21. When controlling the opening and closing timings of the exhaust valve 21, the exhaust variable valve actuation mechanism 31 is driven so that the actual opening and closing timings of the exhaust valve 21 approaches its target opening and closing timings.

The opening and closing timings of the intake valve 20 and the exhaust valve 21 are represented by the relative rotational phases of the intake and exhaust camshafts with respect to the crankshaft. The change amounts of the opening and closing timings are converted into crank angles (° CA). The actual opening and closing timings of the intake valve 20 is calculated based on detection signals from the crank position sensor 10 and the intake cam position sensor 24. The actual opening and closing timings of the intake valve 20 is set at a reference value of 0° CA in its most retarded state. This value increases as the actual opening and closing timings of the intake valve 20 advances from the most retarded state. The actual opening and closing timings of the exhaust valve 21 is calculated based on detection signals from the crank position sensor 10 and the exhaust cam position sensor 32. The actual opening and closing timings of the exhaust valve 21 is set at a reference valve of 0° CA in its most advanced state. This value increases as the actual opening and closing retard from the most advanced state.

Figure 2:
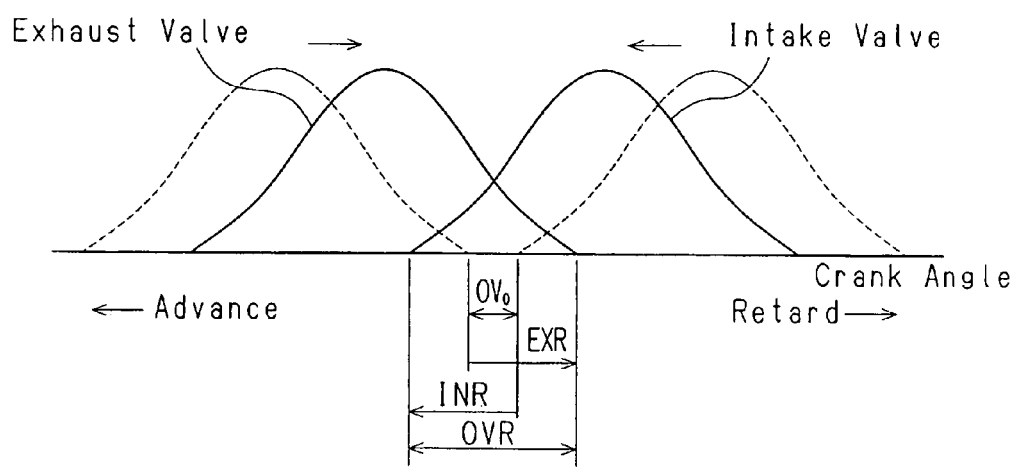
FIG. 2 is a graph showing the relationship of the opening and closing timings of the intake and exhaust valves with respect to the valve overlap amount.

The opening and closing timings of the intake valve 20 and the exhaust valve 21 and the overlap amount of the valves 20 and 21 have the relationship shown in FIG. 2.

The valve overlap amount is a value corresponding to the change amount of the crank angle during a period from when the intake valve 20 opens to when the exhaust valve 21 closes, that is, the period in which the intake valve 20 and the exhaust valve 21 are both open. If the intake valve 20 opens when the crank angle changes by a value of "θ" after the exhaust valve 21 closes, the valve overlap amount takes a value of "−θ". The valve overlap amount has an initial value of $OV_0$ when the actual opening and closing timings of the intake valve 20 and the actual opening and closing timings of the exhaust valve 21 are both at a value of 0° CA as indicated by the broken lines in FIG. 2. The actual valve overlap amount OVR is expressed by equation (1).

$$OVR = INR + EXR + OV_0 \quad (1)$$

In the equation, OVR represents the actual valve overlap amount, INR represents the actual opening and closing timings of the intake valve 20, EXR represents the actual opening and closing timings of the exhaust valve 21, and $OV_0$ represents the initial value of the valve overlap amount.

During transient operation of the engine in which the target opening and closing timings of the intake valve 20 and the exhaust valve 21 change and the actual opening and closing timings of the intake valve 20 and the exhaust valve 21 are adjusted toward the target opening and closing timings, the main control and the sub-control that are described in the "Background of the Invention" section are executed. If the main control is applied to the one of the intake variable valve actuation mechanism 25 and the exhaust variable valve actuation mechanism 31 having a higher response speed when driven and the sub-control is applied to the other one of the two variable valve actuation mechanisms having the lower response speed when driven, the actual valve overlap amount would greatly exceed the target valve overlap amount during transient operation.

Therefore, in the present embodiment, the main control is applied to the one of the intake variable valve actuation mechanism 25 and the exhaust variable valve actuation mechanism 31 having a lower response speed when driven, and the sub-control is applied to the other one of the variable valve actuation mechanisms having the higher response speed when driven. This prevents the actual valve overlap amount from greatly exceeding the target valve overlap amount during transient operation.

Figure 3:
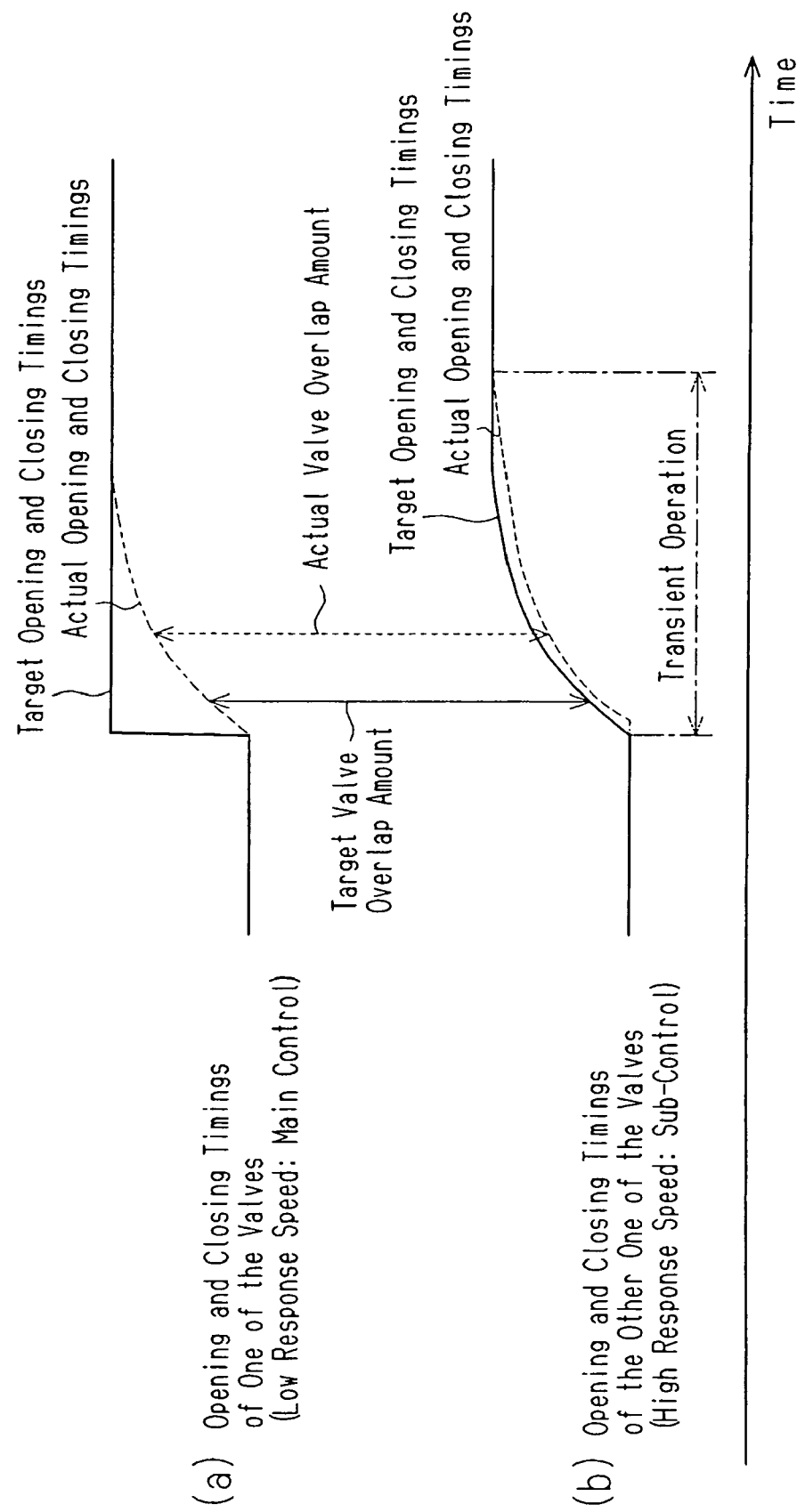
FIG. 3 is a time chart showing changes in the target opening and closing timings and the actual opening and closing timings of the two valves.

The reason why such application of the main control and the sub-control prevents the valve overlap amount from greatly exceeding the target overlap amount during transient operation will now be described with reference to the time chart shown in FIG. 3. In FIG. 3, the solid line in section (a) indicates changes in the target opening and closing timings of one of the two valves during execution of the main control, and the broken line in section (a) indicates changes in the actual opening and closing timings of the same valve during execution of the main control. In FIG. 3, the solid line in section (b) indicates changes in the target opening and closing timings of the other one of the two valves during execution of the sub-control, and the broken line in section (b) indicates changes in the actual opening and closing timings of the same valve during execution of the sub-control. In FIG. 3, the arrow formed by a solid line indicates the target valve overlap amount, and the arrow formed by a broken line indicates the actual valve overlap amount.

As indicated by the solid line shown in section (a), the target opening and closing timings of one of the two valves, which uses the variable valve actuation mechanism having the lower response speed, increase the valve overlap amount during execution of the main control, that is, shift in an upward direction as viewed in FIG. 3. The actual opening and closing timings of this valve is adjusted toward the target opening and closing timings. As indicated by the broken line shown in section (b), the target opening and closing timings of the other one of the two valves, which uses the variable valve actuation mechanism having the higher response speed, are set during execution of the sub-control based on the actual opening and closing timings of the one of the valves adjusted by the main control and the target valve overlap amount so as to decrease the valve overlap amount, that is, shift the valve overlap amount in an upward direction as viewed in FIG. 3.

During such transient operation, the actual opening and closing timings of the other one of the valves (indicated by the broken line in section (b)), of which variable valve actuation mechanism has a higher response speed, is readily adjusted to the target opening and closing timings (as indicated by the solid line in section (b)) during execution of the sub-control. Thus, the actual opening and closing timings of the other one of the valves (as indicated by the broken line in section (b)) are not greatly delayed by the sub-control as compared with the change of the actual opening and closing timings of the one of the valves (as indicated by the broken line in section (a)) adjusted by the main control. As a result, when executing the main control and the sub-control to ensure the required valve overlap amount, the actual valve overlap amount (indicated by the broken-line arrow) is prevented from greatly exceeding the target valve overlap amount (indicated by the solid-line arrow) during transient operation of the engine.

The electromotive variable valve actuation mechanism 25 in most cases has a higher response speed than the hydraulic variable valve actuation mechanism 31. However, the response speeds of the variable valve actuation mechanisms 31 and 25 change in accordance with the engine operation state. For example, the hydraulic variable valve actuation mechanism 31 has a higher response speed at higher engine speeds since the pressure of oil discharged from the oil pump increases in such a state. The electromotive variable valve actuation mechanism 25 has a relatively high response speed even when the engine speed is low. Thus, depending on the operation conditions, such as when the engine speed is high and the pressure of oil supplied to the variable valve actuation mechanism 31 is increased, the hydraulic variable valve actuation mechanism 31 may have a higher response speed than the electromotive variable valve actuation mechanism 25.

Accordingly, in the present embodiment, the ECU 35, which functions as a determination unit, determines which one of the intake variable valve actuation mechanism 25 and the exhaust variable valve actuation mechanism 31 has a higher response speed based on the engine operation state. The ECU 35, which also functions as a switch unit, then switches the variable valve actuation mechanism to which the main control is applied and the variable valve actuation mechanism to which the sub-control is applied in accordance with the determination result so that the sub-control is always applied to the one of the variable valve actuation mechanisms having the higher response speed. This enables the sub-control to be applied to the one of the variable valve actuation mechanisms having the higher response speed and the main control to be applied to the other one of the variable valve actuation mechanisms having the lower response speed even when the variable valve actuation mechanism having the higher response speed and the variable valve actuation mechanism having the lower response speed are switched due to the engine operation state.

Next, a process for calculating the target opening and closing timings of the intake valve 20 and the exhaust valve 21 when the main control is applied to the electromotive intake variable valve actuation mechanism 25 and the sub-control is applied to the hydraulic exhaust variable valve actuation mechanism 31 will be described.

During execution of the main control, the target opening and closing timings INP of the intake valve 20 is calculated based on the engine speed and the engine load by referring to a predetermined map. The calculated target opening and closing timings INP is the optimum opening and closing timings that are in accordance with the engine operation state. The engine speed is calculated based on the detection signal from the crank position sensor 10, and the engine load is calculated based on the calculated engine speed and the intake air amount of the engine 1. The intake air amount of the engine 1 is calculated based on detection signals from sensors including the airflow meter 12, the throttle position sensor 15, and the accelerator pedal position sensor 14. During execution of the main control, the intake variable valve actuation mechanism 25 is driven so that the actual opening and closing timings INR of the intake valve 20 approaches the calculated target opening and closing timings INP.

During execution of the sub-control, the target opening and closing timings EXP of the exhaust valve 21 is calculated based on the target valve overlap amount OVP, which is calculated based on the engine speed and the engine load, and the actual opening and closing timings INR of the intake valve 20 using equation (2).

$$EXP = OVP - (INR + OV_0) \quad (2)$$

In equation (2), EXP represents the opening and closing timings of the exhaust valve 21, OVP represents the target overlap amount, INR represents the actual opening and closing timings of the intake valve 20, and $OV_0$ represents the initial value of the valve overlap amount.

By using equation (2), the target opening and closing timings EXP of the exhaust valve 21 is calculated as a value that achieves the optimum valve overlap amount in accordance with the engine operation state, that is, the target valve overlap amount OVP. During execution of the sub-control, the exhaust variable valve actuation mechanism 31 is driven so that the actual opening and closing timings EXR of the exhaust valve 21 approaches the calculated target opening and closing timings EXP. As a result, the actual opening and closing timings EXR of the exhaust valve 21 changes in a manner that the actual valve overlap amount OVR approaches the target valve overlap amount OVP.

Next, a process for calculating the target opening and closing timings of the intake valve 20 and the exhaust valve 21 when the main control is applied to the hydraulic exhaust variable valve actuation mechanism 31 and the sub-control is applied to the electromotive intake variable valve actuation mechanism 25 will be described.

In this case, during execution of the main control, the target opening and closing timings EXP of the exhaust valve 21 is calculated based on the engine speed and the engine load by referring to a predetermined map. The calculated target opening and closing timings EXP is the optimum opening and closing timings that is in accordance with the engine operation state. During execution of the main control, the exhaust variable valve actuation mechanism 31 is driven so that the actual opening and closing timings EXR of the exhaust valve 21 approaches the calculated target opening and closing timings EXP.

During execution of the sub-control, the target opening and closing timings INP of the intake valve 20 is calculated based on the target valve overlap amount OVP, which is calculated based on the engine speed and the engine load, and the actual opening and closing timings EXR of the exhaust valve 21, using equation (3).

$$INP = OVP - (EXR + OV_0) \quad (3)$$

In equation (3), INP represents the target opening and closing timings of the intake valve, OVP represents the target overlap amount, EXR represents the actual opening and closing timings of the exhaust valve, and $OV_0$ represents the initial value of the valve overlap amount.

By using equation (3), the target opening and closing timings INP of the intake valve 20 is calculated as a value that achieves the optimum valve overlap amount that is in accordance with the engine operation state, that is, the target valve overlap amount OVP. During execution of the sub-control, the intake variable valve actuation mechanism 25 is driven so that-the actual opening and closing timings INR of the intake valve 20 approaches the calculated target opening and closing timings INP. As a result, the actual opening and closing timings INR of the intake valve 20 changes in a manner that the actual valve overlap amount OVR approaches the target valve overlap amount OVP.

The procedures for executing the main control and the sub-control will now be described in detail with reference to the flowchart shown in FIG. 4. The process shown in FIG. 4 may be executed by the ECU 35 as an interrupt at every predetermined crank angle.

First, the ECU 35 determines whether the engine is in a transient operation (S101). In detail, the ECU 35 determines whether the following two conditions are satisfied. (1) The target opening and closing timings of the intake valve 20 or the exhaust valve 21 have changed. (2) The time required by the actual opening and closing-timings to converge on the target opening and closing timings has elapsed after the change of the target opening and closing timings.

The ECU 35 determines that the engine is in transient operation when the above conditions (1) and (2) are both satisfied (S101: YES). The ECU 35 then proceeds to step S102 and the subsequent steps to execute the main control and the sub-control. The ECU 35 determines that the engine is not in the transient operation when at least one of the conditions (1) and (2) is not satisfied (S101: NO). In this case, the ECU 35 does not execute the main control and the sub-control described above as the opening and closing timing control of the intake valve 20 and the exhaust valve 21.

The opening and closing timing control that is executed when step S101 results in a negative determination may be, for example, control for adjusting the opening and closing timings of the intake valve 20 and the exhaust valve 21 to the optimum opening and closing timings. During execution of such opening and closing timing control, the target opening and closing timings INP and EXP of the intake valve 20 and the exhaust valve 21 are calculated based on parameters including the engine speed, the engine load, and the target valve overlap amount OVP. The intake variable valve actuation mechanism 25 and the exhaust variable valve actuation mechanism 31 are separately driven so that the actual opening and closing timings INR and EXR of the intake valve 20 and the exhaust valve 21 separately approach the calculated target opening and closing timings INP and EXP.

In step S102 and subsequent steps for executing the main control and the sub-control, the ECU 35 first determines which one of the intake variable valve actuation mechanism 25 and the exhaust variable valve actuation mechanism 31 currently has a higher response speed based on parameters including the engine speed, the engine load, and the coolant temperature (S102). These parameters affect the pressure of oil supplied to the hydraulic variable valve actuation mechanism 31. The mechanism 31 tends to have a higher response speed as the hydraulic pressure increases. Thus, the above parameters are used to determine which one of the variable valve actuation mechanisms currently has a higher response speed. After this determination, the ECU 35 performs steps S103 and S104 as the main control and steps S105 to S108 as the sub-control.

The ECU 35 calculates the target opening and closing timings of the valve corresponding to the variable valve actuation mechanism having a lower response speed based on the engine speed and the engine load (S103). The ECU 35 calculates the target opening and closing timings INP of the intake valve 20 when the electromotive intake variable valve actuation mechanism 25 has a lower response speed than the hydraulic exhaust variable valve actuation mechanism 31. The ECU 35 calculates the target opening and closing timings EXP of the exhaust valve 21 when the hydraulic exhaust variable valve actuation mechanism 31 has a lower response speed than the electromotive intake variable valve actuation mechanism 25. Then, the ECU 35 drives the variable valve actuation mechanism having the lower response speed so that the actual opening and closing timings of the corresponding valve is adjusted toward its target opening and closing timings. (S104).

The ECU 35 detects the actual opening and closing timings of the valve corresponding to the variable valve actuation mechanism having a lower response speed based on detection signals from the crank position sensor 10 and the cam position sensors 24 and 32 when driving the variable valve actuation mechanism having the lower response speed (S105). The ECU 35 then calculates the optimum valve overlap amount in accordance with the engine operation state, that is, the target valve overlap amount OVP, based on the engine speed and the engine load (S106).

The ECU 35 calculates the target opening and closing timings corresponding to the variable valve actuation mechanism having the higher response speed using equation (2) or equation (3) based on the detected actual opening and closing timings and the calculated target valve overlap amount OVP (S107). The ECU 35 calculates the target opening and closing timings EXP of the exhaust valve 21 using equation (2) when the hydraulic exhaust variable valve actuation mechanism 31 has a higher response speed than the electromotive intake variable valve actuation mechanism 25. The ECU 35 calculates the target opening and closing timings INP of the intake valve 20 using equation (3) when the electromotive intake variable valve actuation mechanism 25 has a higher response speed than the hydraulic exhaust variable valve actuation mechanism 31. Then, the ECU 35 drives the variable valve actuation mechanism having the higher response speed so that the actual opening and closing timings of the corresponding valve is adjusted toward its target opening and closing timings (S108).

The first embodiment has the advantages described below.

(1) During transient operation of the engine, the main control is applied to one of the two variable valve actuation mechanisms having the lower response speed that corresponds to one of the two valves, and the sub-control is applied to the other one of the variable valve actuation mechanism having the higher response speed that corresponds to the other one of the two valves. This enables the actual opening and closing timings of the other valve (indicated by the broken line in section (b) of FIG. 3) to be adjusted during execution of the sub-control toward the target opening and closing timings (indicated by the solid line in section (b) of FIG. 3) with high responsiveness. As a result, the actual valve overlap amount OVR (indicated by the broken-line arrow) is prevented from greatly exceeding the target valve overlap amount OVP (indicated by the solid-line arrow).

(2) The two variable valve actuation mechanisms have completely different structures. More specifically, one variable valve actuation mechanism is electromotive and the other variable valve actuation mechanism is hydraulic. Thus, the two variable valve actuation mechanisms have significantly different response speeds. If the main control were to be applied to one of the two variable valve actuation mechanisms having the higher response speed and the sub-control were to be applied to the other one of the two variable valve actuation mechanisms having the lower response speed, the significantly different response speeds of the two variable valve actuation mechanisms would cause the actual valve overlap amount OVR to greatly exceed the target valve overlap amount OVP. However, the main control is applied to one of the two variable valve actuation mechanisms having the lower response speed, and the sub-control is applied to the other one of the two variable valve actuation mechanisms having the higher response speed during transient operation of the engine. This ensures that the actual valve overlap amount OVR is prevented from greatly exceeding the target valve overlap amount OVP.

(3) The response speeds of the hydraulic variable valve actuation mechanism 31 and the electromotive variable valve actuation mechanism 25 change in accordance with the engine operation state. Thus, the variable valve actuation mechanism having the higher response speed and the variable valve actuation mechanism having the lower response speed may be switched depending on the engine operation state. Therefore, the ECU 35 determines which one of the two variable valve actuation mechanisms has the higher response speed based on the engine operation state. Based on the determination, the ECU 35 applies the sub-control to the one of the two variable valve actuation mechanisms having the higher response speed. This ensures that the actual valve overlap amount OVR is prevented from greatly exceeding the target valve overlap amount OVP regardless of whether the variable valve actuation mechanism having the higher speed and the variable valve actuation mechanism having the lower speed are switched.

A second embodiment of the present invention will now be described with reference to FIG. 5.

In the second embodiment, the target overlap amount OVP is calculated to be a smaller value when the engine 1 is being accelerated in comparison to other engine conditions. The acceleration of the engine 1 is one condition in which the above transient operation may occur. This prevents the actual valve overlap amount OVR from greatly exceeding the target valve overlap amount OVP.

Figure 4:
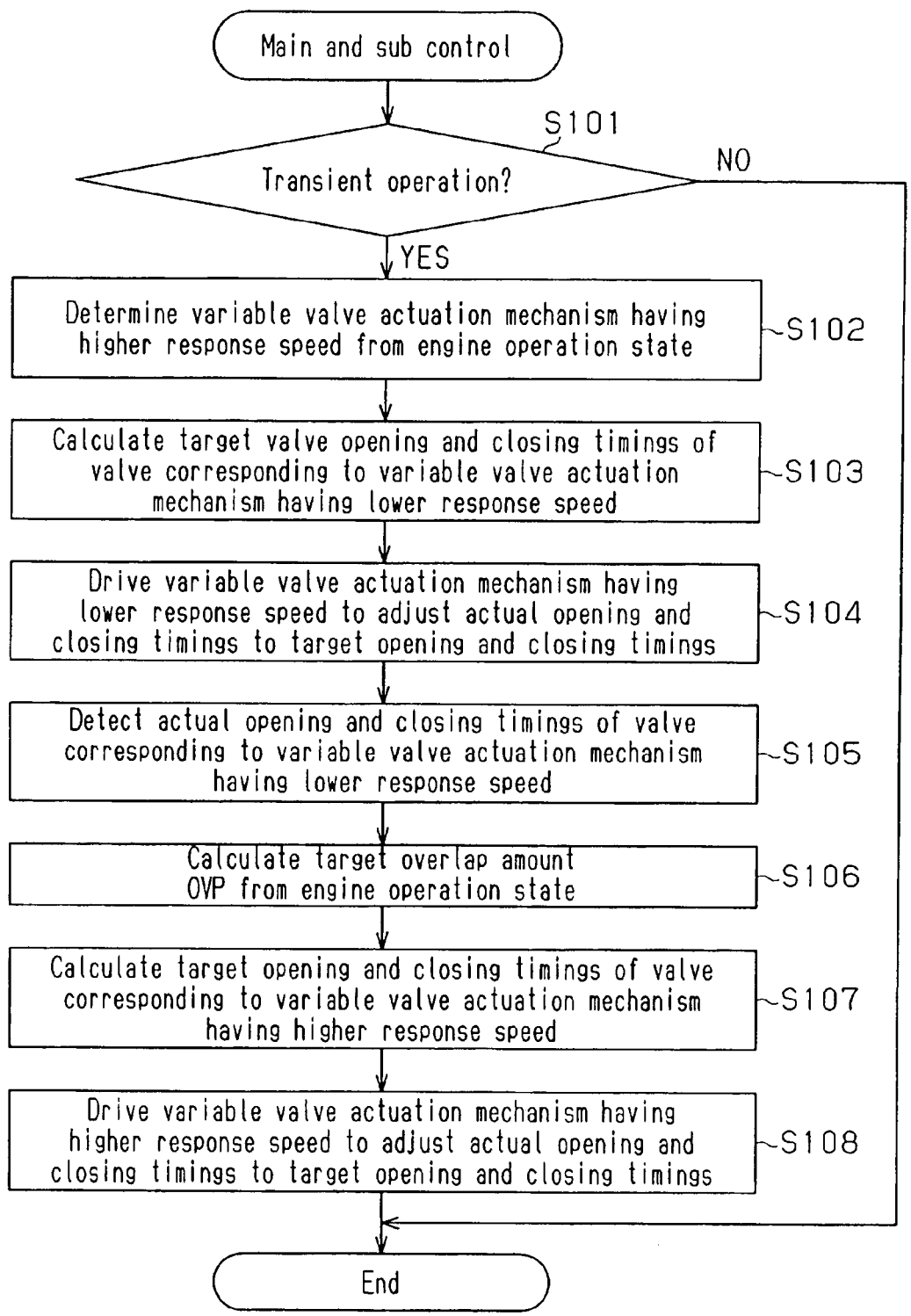
FIG. 4 is a flowchart showing the procedures for executing the main control and the sub-control.
Figure 5:
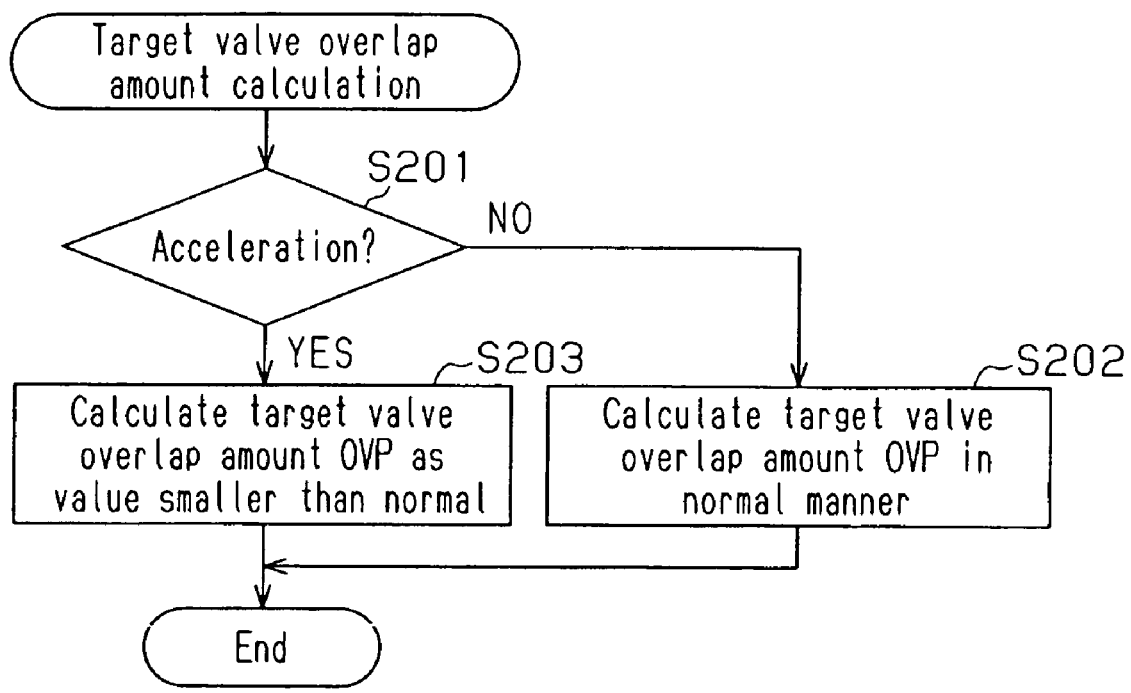
FIG. 5 is a flowchart showing the procedures for calculating a target valve overlap amount according to a second embodiment of the present invention.

FIG. 5 is a flowchart showing the procedures for calculating the target valve overlap amount during step S106 when executing the main control and the sub-control shown in FIG. 4. The target valve overlap amount is calculated whenever step S106 is performed. The ECU 35 determines whether the engine 1 is being accelerated based on parameters including the engine speed (S201). When determining that the engine 1 is not being accelerated, the ECU 35 calculates the target valve overlap amount OVP in a normal manner (S202). When determining that the engine 1 is being accelerated, the ECU 35 calculates the target valve overlap amount OVP as a value smaller than normal (S203).

The second embodiment has the advantages described below.

(4) The engine 1 is required to produce a high output during acceleration. Thus, the internal EGR amount may increase excessively during acceleration and destabilize combustion of the engine 1. Such a situation must be avoided. The acceleration of the engine 1 is one condition during which the engine is in a transient operation. During acceleration, the sub-control is applied to the one of the two variable valve actuation mechanisms having the higher response speed. This prevents the actual valve overlap amount OVR from greatly exceeding the target valve overlap amount OVP. As a result, the internal EGR amount is prevented from increasing excessively during acceleration, and unstable combustion of the engine 1 is prevented. Further, the target valve overlap amount OVP is calculated as a smaller value during acceleration than in other engine conditions. The actual valve overlap amount OVR is then adjusted to the calculated target valve overlap amount OVP. This reduces the actual valve overlap amount OVR. As a result, excessive internal EGR amount is further accurately prevented from lowering the acceleration performance of the engine 1.

It should be apparent to those skilled in the art that the present invention may be embodied in many other specific forms without departing from the spirit or scope of the invention. Particularly, it should be understood that the present invention may be embodied in the following forms.

The main control and the sub-control may be executed under engine conditions other than a transient operation of the engine.

The electromotive variable valve actuation mechanism basically has a higher response speed than the hydraulic variable valve actuation mechanism. Thus, the variable valve actuation mechanism to which the main control is applied may be fixed as the hydraulic exhaust variable valve actuation mechanism 31 and the variable valve actuation mechanism to which the sub-control is applied may be fixed as the electromotive intake variable valve actuation mechanism 25.

In an engine operation state where the two variable valve actuation mechanisms have response speeds that only slightly differ from each other, the variable valve actuation mechanism to which the main control is applied and the variable valve actuation mechanism to which the sub-control is applied may be fixed. In this case, it is preferable that the variable valve actuation mechanism to which the main control is applied be fixed as the hydraulic exhaust variable valve actuation mechanism 31 and the variable valve actuation mechanism to which the sub-control is applied be fixed as the electromotive intake variable valve actuation mechanism 25.

The intake variable valve actuation mechanism 25 may be hydraulic, and the exhaust variable valve actuation mechanism 31 may be electromotive.

The two variable valve actuation mechanisms may both be hydraulic. Even in this case, the two variable valve actuation mechanisms, which are installed at different positions, inevitably have different response speeds. Thus, applying the sub-control to the one of the two variable valve actuation mechanisms having the higher response speed obtains the same advantages as described in the above embodiments.

The present invention is applied to the engine 1 including the variable valve actuation mechanisms for varying the opening and closing timings of the intake valve 20 and the opening and closing timings of the exhaust valve 21 as the valve characteristic of the intake valve 20 and the exhaust valve 21. However, the application of the present invention is not limited in such a manner. For example, the present invention is applicable to an engine including variable valve actuation mechanisms for its intake and exhaust camshafts to vary the maximum valve lift and the valve actuation angle as the valve characteristic of the intake valve 20 and the exhaust valve 21. Such intake and exhaust variable valve actuation mechanisms are driven to adjust the valve overlap amount.

The present examples and embodiments are to be considered as illustrative and not restrictive, and the invention is not to be limited to the details given herein, but may be modified within the scope and equivalence of the appended claims.

What is claimed is:

1. A valve characteristic controller for an internal combustion engine, wherein the engine includes a variable valve actuation mechanism for varying a valve characteristic of an intake valve and a variable valve actuation mechanism for varying a valve characteristic of an exhaust valve, the controller comprising:
    a main control unit for calculating a target characteristic of a first valve, which is one of the intake valve and the exhaust valve, in accordance with an operation state of the engine, and controlling the variable valve actuation mechanism corresponding to the first valve so that the valve characteristic of the first valve is adjusted to the target characteristic of the first valve; and
    a sub-control unit for calculating a target characteristic of a second valve, which is the other one of the intake valve and the exhaust valve, based on a target valve overlap amount, which is calculated in accordance with the operation state of the engine, and an actual valve characteristic of the first valve, and controlling the variable valve actuation mechanism corresponding to the second valve so that the valve characteristic of the second valve is adjusted to the target characteristic of the second valve,
    wherein control with the main control unit is executed on the one of the two variable valve actuation mechanisms having a lower response speed, and control with the sub-control unit is executed on the other one of the two variable valve actuation mechanisms having a higher response speed.

2. The valve characteristic controller according to claim 1, wherein the control with the main control unit and the control with the sub-control unit are executed at least when the engine is in a transient operation.

3. The valve characteristic controller according to claim 2, wherein the transient operation includes a state in which the engine is undergoing acceleration, and the target valve overlap amount is calculated as a smaller value when the engine is undergoing acceleration compared to when the engine is in other states.

4. The valve characteristic controller according to claim 1, wherein the one of the two variable valve actuation mechanisms is a hydraulic variable valve actuation mechanism driven by hydraulic pressure and the other one of the two variable valve actuation mechanisms is an electromotive variable valve actuation mechanism driven by an electric motor.

5. The valve characteristic controller according to claim 4, wherein the control with the main control unit is executed on the hydraulic variable valve actuation mechanism and the control with the sub-control unit is executed on the electromotive variable valve actuation mechanism.

6. The valve characteristic controller according to claim 4, further comprising:
    a determination unit for determining which one of the hydraulic variable valve actuation mechanism and the electromotive variable valve actuation mechanism has a higher response speed based on the operation state of the engine; and
    a switch unit for switching the variable valve actuation mechanism on which the control with the main control unit is executed and the variable valve actuation mechanism on which the control with the sub-control unit is executed in accordance with the determination result of the determination unit.

7. The valve characteristic controller according to claim 6, wherein the operation state of the engine includes a parameter that affects pressure of oil supplied to the hydraulic variable valve actuation mechanism.

8. The valve characteristic controller according to claim 1, wherein the valve characteristic of the intake valve is opening and closing timings of the intake valve, and the valve characteristic of the exhaust valve is opening and closing timings of the exhaust valve.

9. An internal combustion engine comprising:
    a combustion chamber;
    an intake passage and an exhaust passage, each connected to the combustion chamber;
    an intake valve for opening and closing the combustion chamber to the intake passage;
    a variable valve actuation mechanism for varying a valve characteristic of the intake valve;
    an exhaust valve for opening and closing the combustion chamber to the exhaust passage;
    a variable valve actuation mechanism for varying a valve characteristic of the exhaust valve; and
    a controller for executing a main control on the one of the variable valve actuation mechanisms having a lower response speed and for executing a sub-control on the other one of the variable valve actuation mechanisms having a higher response speed, wherein the controller calculates during the main control a target characteristic of a first valve, which is one of the intake valve and the exhaust valve, in accordance with an operation state of the engine and controls the variable valve actuation mechanism corresponding to the first valve so that the valve characteristic of the first valve is adjusted to the target characteristic of the first valve, and the controller calculates in the sub-control a target characteristic of a second valve, which is the other one of the intake valve and the exhaust valve, based on a target valve overlap amount, which is calculated in accordance with an operation state of the engine, and an actual valve characteristic of the first valve and controls the variable valve actuation mechanism corresponding to the second valve so that the valve characteristic of the second valve is adjusted to the target characteristic of the second valve.

10. The internal combustion engine according to claim 9, wherein the controller executes the main control and the sub-control at least when the engine is in a transient operation.

11. The internal combustion engine according to claim 10, wherein the transient operation includes a state in which the engine is undergoing acceleration, and the target valve overlap amount is calculated as a smaller value when the engine is undergoing acceleration compared to when the engine is in other states.

12. The internal combustion engine according to claim 9, wherein the one of the two variable valve actuation mechanisms is a hydraulic variable valve actuation mechanism driven by hydraulic pressure and the other one of the two variable valve actuation mechanisms is an electromotive variable valve actuation mechanism driven by an electric motor.

13. The internal combustion engine according to claim 12, wherein the controller determines which one of the hydraulic variable valve actuation mechanism and the electromotive variable valve actuation mechanism has a higher response speed based on the operation state of the engine, and switches the variable valve actuation mechanism on which the main control is executed and the variable valve actuation mechanism on which the sub-control is executed in accordance with the determination result.

14. The internal combustion engine according to claim 13, wherein the operation state of the engine includes a parameter that affects pressure of oil supplied to the hydraulic variable valve actuation mechanism.

15. A method for controlling a valve characteristic of an internal combustion engine, wherein the engine includes a variable valve actuation mechanism for varying a valve characteristic of an intake valve and a variable valve actuation mechanism for varying a valve characteristic of an exhaust valve, the method comprising:
　　calculating a target characteristic of a first valve, which is one of the intake valve and the exhaust valve, in accordance with an operation state of the engine;
　　executing main control on the variable valve actuation mechanism corresponding to the first valve so that the valve characteristic of the first valve is adjusted to the target characteristic;
　　calculating a target valve overlap amount in accordance with an operation state of the engine;
　　calculating a target characteristic of a second valve, which is the other one of the intake valve and the exhaust valve, based on the target valve overlap amount and an actual valve characteristic of the first valve;
　　executing sub-control on the variable valve actuation mechanism corresponding to the second valve so that the valve characteristic of the second valve is adjusted to the target characteristic; and
　　executing the main control on the one of the variable valve actuation mechanisms having a lower response speed and executing the sub-control on the other one of the variable valve actuation mechanisms having a higher response speed.

16. The method according to claim 15, wherein the main control and the sub-control are executed at least when the engine is in a transient operation.

17. The method according to claim 16, wherein the transient operation includes a state in which the engine is undergoing acceleration, and the target valve overlap amount is calculated as a smaller value when the engine is undergoing acceleration compared to when the engine is in other states.

18. The method according to claim 15, wherein the one of the two variable valve actuation mechanisms is a hydraulic variable valve actuation mechanism driven by hydraulic pressure and the other one of the two variable valve actuation mechanisms is an electromotive variable valve actuation mechanism driven by an electric motor, the method further comprising:
　　determining which one of the hydraulic variable valve actuation mechanism and the electromotive variable valve actuation mechanism has a higher response speed based on the operation state of the engine; and
　　switching the variable valve actuation mechanism on which the main control is executed and the variable valve actuation mechanism on which the sub-control is executed in accordance with the determination result.

19. The valve characteristic control method according to claim 18, wherein the operation state of the engine includes a parameter that affects pressure of oil supplied to the hydraulic variable valve actuation mechanism.

* * * * *